United States Patent [19]
Baumann et al.

[11] Patent Number: 6,140,590
[45] Date of Patent: Oct. 31, 2000

[54] STATOR WINDING INSULATION

[75] Inventors: Thomas Baumann, Wettingen; Jörg Oesterheld, Fislisbach; Roland Schuler, Wettingen, all of Switzerland

[73] Assignee: ABB Research Ltd., Zurich, Switzerland

[21] Appl. No.: 09/060,200

[22] Filed: Apr. 15, 1998

[30] Foreign Application Priority Data

May 16, 1997 [DE] Germany .......................... 197 20 555

[51] Int. Cl.$^7$ .................................. H01B 17/00
[52] U.S. Cl. .................. 174/137 B; 174/110 R; 174/113 R; 174/137 A; 174/137 R
[58] Field of Search ........................ 174/137 B, 137 A, 174/137 R, 139, 110 R, 113 R, 119 R, 119 C, 120 R, 120 C

[56] References Cited

U.S. PATENT DOCUMENTS

| | | | |
|---|---|---|---|
| 3,168,434 | 2/1965 | Heyman | 162/124 |
| 4,085,250 | 4/1978 | Smith | 428/324 |
| 4,606,785 | 8/1986 | Zeise | 156/305 |
| 4,806,806 | 2/1989 | Hjortsberg et al. | 310/45 |
| 5,540,969 | 7/1996 | Schuller | 428/248 |

FOREIGN PATENT DOCUMENTS 271613  9/1968  Austria .
2818193C2  11/1979  Germany .

OTHER PUBLICATIONS

"Isolierstoffe fur die Elektrotechnik, insbesondere fur den Elektromaschinenbau", Scheffold, pp. 328–333, No Date.

"Novomikaband 200—Kunstharzisolierung fur Hochspannungsmaschinen", Haase, et al., ELEKTRIE Heft 4 (1967), pp. 137–140.

"Herstellung der Wicklungen elektrischer Maschinen", Sequenz, pp. 62–63, No Date.

*Primary Examiner*—Dean A. Reichard
*Assistant Examiner*—W. David Walkenhorst
*Attorney, Agent, or Firm*—Burns, Doane, Swecker & Mathis, L.L.P.

[57] ABSTRACT

A stator winding insulation for improving the dielectric and thermal properties of a main insulation of a conductor bar of an electric machine. The stator winding insulation includes a mica band having at least one layer-like carrier composed of longitudinal threads and transverse threads and a mica-containing layer fixed to at least one face of the carrier with the aid of a binder. In the layer-like carrier, the volume ratio of the longitudinal threads to the transverse threads is greater than or equal to 2.5:1 and a weight ratio of the mica in the mica-containing layer to the layer-like carrier in the mica band is greater than or equal to 6:1.

6 Claims, 1 Drawing Sheet

STATOR WINDING INSULATION

BACKGROUND OF THE INVENTION

1. Field of the Invention

The present invention relates to the field of insulation technology for windings of electric machines.

Stator winding insulation of the type initially mentioned comprises a mica band with at least one layer-like carrier and with a mica layer fixed to at least one face of the carrier with the aid of a binder. Stator winding insulation of this type is used preferably in windings of electric machines for high powers and utilization.

2. Discussion of Background

The present invention refers to a state of the art of winding insulations such as is described, for example, in H. Sequenz: Herstellung elektrischer Wicklungen [Manufacture of electric windings], Springer Verlag, 1973, especially pages 62 and 63. In the sequenz article, winding insulations of this type comprise mica bands which contain fibrous solid sheets, such as paper, silk or glass textile fabric, to which one or more plies of laminated mica or mica paper are adhesively bonded by means of a flexible binder. The insulating properties of winding insulation composed of such mica bands are determined primarily by the dielectrically high-grade mica and by the dielectrically lower-grade materials of the carrier and of the binder or impregnating agent.

A critical factor in insulating the stator winding conductors of electric machines relative to the grounded lamination bundle is electric and mechanical properties of the main insulation. In the case of rated voltages of some 100 V up to 30000 V, the thickness of the main insulation varies within the range of 0.5 to 8 mm in the case of a stress of approximately 2 kV/mm. In addition to this, there is the high demand placed on the insulation, this being the result of thermal stress and, in the case of machines with long stator core lengths, of thermal mechanical expansion forces in the longitudinal direction of the slot.

SUMMARY OF THE INVENTION

Accordingly, one object of the invention, is to provide novel stator winding insulation of the type initially mentioned, which has improved dielectric and thermal properties as compared with stator winding insulation according to the prior art.

The essence of the invention is to be seen essentially in that the stator winding insulation makes use of layer-like carriers in the form of fabric structures which have a volume ratio of longitudinal threads to transverse threads of at least 2.5:1, these carriers being provided with fine mica having a high packing density, and the weight ratio of fine mica to carrier material in the mica band thus composed being equal to or greater than 6:1, thereby making it possible to have a compact insulating structure which, whilst being of smaller thickness, provides electric strength at least equal to that of known mica bands of the prior art and, in addition, a substantially higher thermal conductivity.

The advantages of the invention are to be seen, inter alia, in that, after the mica band according to the invention has been impregnated with a resin, the fraction of electrically and thermally lower-grade binder resin and a glass fabric fraction are decisively reduced, as compared with the high-grade fine mica fraction.

BRIEF DESCRIPTION OF THE DRAWINGS

A more complete appreciation of the invention many of the attendant advantages thereof will be readily obtained as the same becomes better understood by reference to the following detailed description when considered in connection with the accompanying drawings, wherein.

Only the elements essential for understanding the invention are shown diagrammatically.

DESCRIPTION OF THE PREFERRED EMBODIMENT

Figure 1:
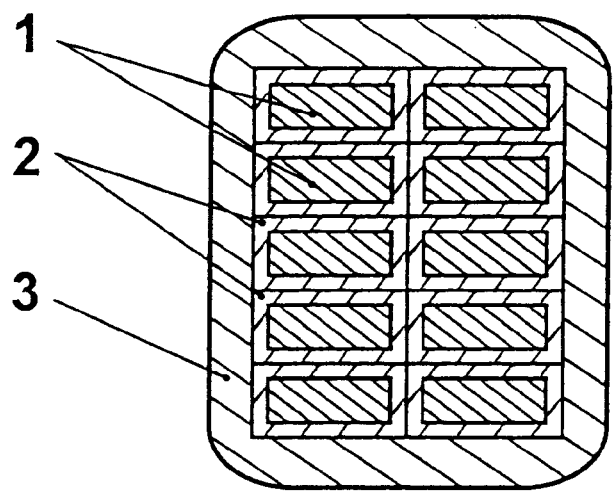
FIG. 1 shows a section through a conductor bar of an electric machine, said conductor bar being provided with main insulation.

Referring now to the drawings, wherein like reference numerals designate identical or corresponding parts throughout the several views, in FIG. 1 a conductor bar of an electric machine is composed of a multiplicity of part conductors 1 which are insulated relative to one another and which are each provided with part conductor or turn insulation 2. The part conductors 1 combined to form a conductor bunch are surrounded by main insulation.

Figure 2:
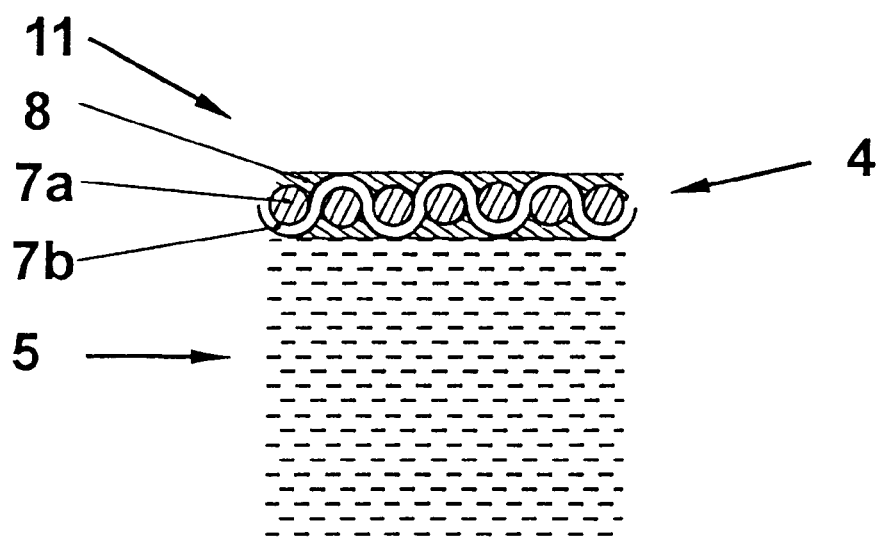
FIG. 2 shows a greatly enlarged detail from FIG. 1, showing one ply of a mica band of the main insulation.

The layered structure of a mica band of the main insulation 3 can be seen in the greatly enlarged detail according to FIG. 2. This illustrates, for the sake of simplification, only one ply of the main insulation 3 which is composed of two layers, a mica paper layer 5 and an inorganic fabric layer 4, here designed as a glass fabric layer. The meshes of the glass fabric 4 having longitudinal threads 7a and transverse threads 7b, that is to say the space between adjacent glass threads of the glass fabric 4, is filled completely with a resin, preferably epoxide resin, particular advantage being afforded if the glass fabric has been thermally desized. In order to keep the fraction of dielectrically and thermally lower-grade epoxide resin in the glass fabric layer 4 as small as possible, according to the invention the volume ratio of the longitudinal threads 7a to the transverse threads 7b is greater than or equal to 2.5:1. This achieves a fabric structure which, on the one hand, has resin-filled meshes which are as small as possible and, on the other hand, is sufficiently strong for the production and further processing of a mica band 11 manufactured from it. Said volume ratio of longitudinal threads 7a to transverse threads 7b of 2.5:1 increases the glass content in relation to the resin fraction in the fabric layer 4 after impregnation by about 25%, as compared with conventional mica bands. Since the glass fabric itself has comparatively good thermal conductivity in comparison with the epoxide resin, the thermal conductivity of the resin-impregnated and cured fabric layer 4 therefore also increases correspondingly.

According to the idea of the invention, the mica band 11 has particularly good dielectric properties if the weight ratio of mica content to glass fabric content is 6:1 or greater. In this case, the use of thermally hydrolysed fine mica proves particularly advantageous, the resin fraction in the impregnated and cured mica layer 5 thereby being reduced by about 20%. At the same time, a weight ratio of the fine mica fraction to the resin fraction of about 6:1 is established. This measure increases the thermal conductivity of the mica band 11 correspondingly, since mica has relatively good thermal conductivity, as compared with resin.

If the fabric layer 4 is provided with a thermally high-grade finish, such as, for example, aminosilane, before being coated with the mica paper 5, the insulation according to the invention, with a conventional epoxide resin as binder, is thermally stable and can be used up to thermal class H (180° C.).

Stator insulation according to the invention by means of a mica band 11 has thermal conductivity up to about 0.4 W/mK which is up to 50% better than that of conventional insulations. In addition, there is a better dielectric behavior, along with a smaller thickness, as a result of the increased mica content. The use of a mica band 11 of this type in main insulation 3 thus affords the following advantages:

- The main insulation 3 is thinner and has better thermal conductivity, along with a better dielectric behavior. The thermally restricted limiting power may be increased by virtue of better possibilities for cooling the winding bars.
- The groove filling factor for winding bars inserted in stator grooves is increased, thus reducing the losses.
- Electric machines can have a smaller design for the same electric powers.

However, the invention, as described, is not restricted to the exemplary embodiment illustrated. Thus, for example, it is also conceivable to use, instead of the glass fabric 4, a mixed fabric with longitudinal threads 7a made from glass threads and transverse threads 7b made from synthetic, ceramic or aluminum oxide fibers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the Unite States is:

1. A stator winding insulation comprising: a mica band with at least one layer-like carrier composed of longitudinal threads having a first uniform cross-section and transverse threads having a second uniform cross-section different from the first uniform cross-section, and a mica-containing layer fixed to at least one face of the carrier with the aid of a binder, wherein, in the layer-like carrier the volume ratio of the longitudinal threads to the transverse threads is greater than or equal to 2.5:1, and wherein a weight ratio of the mica to the layer-like carrier in the mica band is greater than or equal to 6:1.

2. The stator winding insulation as claimed in claim 1, wherein the layer-like carrier comprises an inorganic fabric.

3. The stator winding insulation as claimed in claim 2, wherein the inorganic fabric is a glass fabric.

4. The stator winding insulation as claimed in claim 2, wherein the inorganic fabric is a mixed fabric with longitudinal threads made from inorganic fibers and transverse threads made from synthetic fibers.

5. The stator winding insulation as claimed in claim 1, wherein the layer-like carrier is provided with a thermally high-grade finish.

6. The stator winding insulation as claimed in claim 1, wherein the mica in the mica-containing layer is fine mica having a high packing density.

\* \* \* \* \*